United States Patent
Xie (10) Patent No.: US 9,525,493 B2
(45) Date of Patent: Dec. 20, 2016

(54) DIFFERENTIAL-CODING AND DECODING FOR QUADRATURE DUOBINARY COHERENT OPTICAL COMMUNICATION SYSTEMS

(71) Applicant: Alcatel-Lucent USA Inc., Murray Hill, NJ (US)

(72) Inventor: Chongjin Xie, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 59 days.

(21) Appl. No.: 14/579,389

(22) Filed: Dec. 22, 2014

(65) Prior Publication Data

US 2016/0105246 A1   Apr. 14, 2016

Related U.S. Application Data

(60) Provisional application No. 62/063,671, filed on Oct. 14, 2014.

(51) Int. Cl.
*H04B 10/04* (2006.01)
*H04B 10/61* (2013.01)
*H04L 27/34* (2006.01)

(52) U.S. Cl.
CPC ............ *H04B 10/616* (2013.01); *H04B 10/61* (2013.01); *H04L 27/34* (2013.01)

(58) Field of Classification Search
CPC ........................ H94B 10/616; H94B 10/6165
See application file for complete search history.

(56) References Cited

U.S. PATENT DOCUMENTS

| | | | | |
|---|---|---|---|---|
| 5,321,725 A * | 6/1994 | Paik | ...................... | H04L 1/0057 348/155 |
| 2006/0232416 A1* | 10/2006 | Bauch | .................. | H04B 7/0669 340/572.7 |
| 2012/0020435 A1* | 1/2012 | Xu | ...................... | H04L 27/3405 375/298 |
| 2013/0070785 A1* | 3/2013 | Liu | .......................... | C02F 1/78 370/464 |
| 2014/0195878 A1* | 7/2014 | Razzetti | ............. | H04B 10/6165 714/776 |

OTHER PUBLICATIONS

Griesser, H., et al., "Quaternary Duobinary Modulation for Superchannels with Sub-Nyquist Subcarrier Spacing," Optical Fiber Communication Conference and Exposition (OFC/NFOEC) 2012 and the National Fiber Optic Engineers Conference, Mar. 4-8, 2012, 3 pages.

(Continued)

*Primary Examiner* — Dzung Tran
(74) *Attorney, Agent, or Firm* — Parker Justiss, PC (57) ABSTRACT

A method comprising, receiving digital-electrical input symbols of a stream of input symbols, the input symbols corresponding to signal points of a symbol constellation. The method also comprises classifying the input symbols, wherein a first symbol class comprises input symbols corresponding to signal points that are variant to rotation of the symbol constellation, and, a second symbol class comprises input symbols corresponding to signal points that are invariant to rotation of the symbol constellation. The method also comprises applying selective differential coding only to those input symbols of the first symbol class.

21 Claims, 5 Drawing Sheets

(56) References Cited

OTHER PUBLICATIONS

Kikuchi, K., et al., "Coherent Demodulation of Optical Quadrature Duobinary Signal with Spectral Efficiency of 4 bit/s/Hz per Polarization," 33rd European Conference and Exhibition of Optical Communication (ECOC), Sep. 16-20, 2007, 2 pages.

Li, Jianqiang, et al., "Spectrally Efficient Quadrature Duobinary Coherent Systems with Synbol-Rate Digital Signal Processing," Journal of Lightwave Technology, vol. 29, No. 8, Apr. 15, 2011, pp. 1098-1104.

Cai, Y., et al., "High Spectral Efficiency Longhaul Transmission with pre Filtering and Maximum A Posteriori Probability Detection," 2010 Proceedings of European Conference on Optical Communication, We.7.C.4., 2010.

Lyubomirsky, I., "Quadrature Duobinary for High-Spectral Efficiency 100G Transmission," Journal of Lightwave Technology, vol. 28, No. 1, Apr. 2011, pp. 91-96.

Li, J., et al., "Spectrally Efficient Quadrature Duobinary Coherent Systems with Symbol-rate Digital Signal Processing," Journal of Lightwave Technology, vol. 29, No. 8, Apr. 2011, pp. 1098-1104.

Zhang, J., et al., "Multi-Modulus Blind Equalizations for Coherent Quadrature Duobinary Spectrum Shaped PM-QPSK Digital Signal Processing," Journal of Lightwave Technology, vol. 31, No. 7, Apr. 1, 2013, pp. 1073-1078.

Chen, S., et al. "Comparison of Advanced Detection Techniques for QPSK Signals in Super-Nyquist WDM Systems," IEEE Photonics Technology Letters, accepted for Publication 2014.

Penninckx, H., et al., "Optical Differential Phase Shift Keying (DPSK) Direct Detection Considered as a Duobinary Signal," 2001 Proceedings of European Conference on Optical Communication, vol. 3 pp. 456-457.

Prokais, J.G., "Digital Communications," McGraw-Hill Higher Education, 2000, 4th Ed., Chapt. 9, pp. 565-570.

Xie, C., et al., "Digital PLL Based Frequency Offset Compensation and Carrier Phase Estimation for 16-QAM Coherent Optical Communication Systems," 2012 Proceedings of European Conference on Optical Communication, paper Mo.1.A.2.2012.

Lyubomirsky, Ilya, "Quadrature Duobinary Modulation for 100G Transmission Beyond the Nyquist Limit", University of California, OSA/OFC/NFOEC, 2010, 3 pgs.

Meiyappan, Adaickalavan et al., "On Decision Aided Carrier Phase and Frequency Offset Estimation in Coherent Optical Receivers", Journal of Lightwave Technology, vol. 31, No. 13, Jul. 1, 2013, pp. 2055-2069.

Prokais, J.G., "Digital Communications," McGraw-Hill Higher Education, 2000, 4th Ed., Chapt. 9, pp. 534-582.

\* cited by examiner

DIFFERENTIAL-CODING AND DECODING FOR QUADRATURE DUOBINARY COHERENT OPTICAL COMMUNICATION SYSTEMS

This application claims the benefit of U.S. Provisional Application Ser. No. 62/063,671, filed by Chongjin Xie on Oct. 14, 2014, entitled "DIFFERENTIAL-CODING AND DECODING FOR QUADRATURE DUOBINARY COHERENT OPTICAL COMMUNICATION SYSTEMS" incorporated herein by reference.

TECHNICAL FIELD OF THE INVENTION

The invention relates, in general, to optical communication systems and to methods of using and manufacturing such systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

Polarization-division-multiplexed (PDM) quadrature duobinary (QDB) modulation with digital coherent detection has promise for use in high speed (e.g., 100 Gb/s or higher) optical communication. One problem with the coherent detection of QDB modulated signals is that cycle-slip can cause catastrophic error propagation. As understood by those skilled in the art cycle-slip can occur when the phase of the optical carrier output by a laser, e.g., a continuous sinusoidal wave signal, wanders.

Efforts to reduce error propagation in coherent detection when using PDM QDB modulation have attempted to recover the absolute carrier phase using periodically inserted pilot symbols in the transmitted data. Recovering the absolute carrier phase in this manner, however, can require more complex carrier phase recovery units and can reduce the spectral efficiency due to the insertion of pilot symbols into the transmitted data stream.

SUMMARY OF THE INVENTION

One embodiment is a method. The method comprises, receiving digital-electrical input symbols of a stream of input symbols, the input symbols corresponding to signal points of a symbol constellation. The method can also comprise classifying the input symbols. In some such embodiments, a first symbol class comprises input symbols corresponding to signal points that are variant to rotation of the symbol constellation, and, a second symbol class comprises input symbols corresponding to signal points that are invariant to rotation of the symbol constellation. The method can also comprise applying selective differential coding only to those input symbols of the first symbol class.

In any embodiments of the method, the symbol constellation can be a quadrature duobinary constellation. In any embodiments of the method, the first symbol class can include symbols [0,1], and [1,0], and the second symbol class can include symbols [0,0] and [1,1]. In any embodiments of the method, the differential coding can be applied to the input symbols according to a differential coding rule, thereby producing differential-coded symbols. In any embodiments of the method, if a given symbol in the first symbol class is equal to an immediately preceding symbol in the first symbol class, then the given symbol can be coded as [1,0], and, if the given symbol is not equal to the immediately preceding symbol in the first symbol class, then the given symbol can be coded as [0,1].

In any embodiments of the method, the symbols of the stream of input symbols can be precoded prior to the selective differential coding for transmission of an output optical data stream in an optical communication system. In any embodiments of the method, the input symbols can include two bits $[DI_n, DQ_n]$, where n is a symbol index, and the symbols can be precoded according to: $PI_n = XOR(DI_n, PI_{n-1})$ and $PQ_n = XOR(DQ_n, PQ_{n-1})$, and, $BI_n = PI_n + PI_{n-1} - 1$ and $BQ_n = PQ_n + PQ_{n-1} - 1$, the precoded symbol being [BIn, BQn].

Any embodiments of the method can further comprise receiving an optical signal carrying an optical stream of input symbols. Any embodiments of the method can further comprise converting the optical stream to the digital-electrical input symbols. In any embodiments of the method, the selective differential coding can produce a stream of selective-differentially-decoded symbols, and can further comprise post-coding symbols of the selective-differentially-decoded symbol stream. In any embodiments of the method, the selective-differentially-decoded symbols can each include two bits $[BI_n, BQ_n]$, where n is a symbol index, and the selective-differentially-decoded symbols are post-coded according to: $DI_n = 1 - |BI_n|$ and $DQ_n = 1 - |BQ_n|$, the post-coded symbol being $[DI_n, DQ_n]$.

Another embodiment is an apparatus. The apparatus comprises a digital signal processor (DSP) configured to receive digital-electrical input symbols of a stream of input symbols, the input symbols corresponding to signal points of a symbol constellation. The apparatus can also comprise a symbol classifier configured to classify the input symbols. In any such embodiments, a first symbol class comprises input symbols corresponding to signal points that are variant to rotation of the symbol constellation, and, a second symbol class comprises input symbols corresponding to signal points that are invariant to rotation of the symbol constellation. The apparatus can also comprise a selective differential encoder configured to apply selective differential coding only to those input symbols of the first symbol class.

In any embodiments of the apparatus, the symbol constellation can be a quadrature duobinary constellation. In any embodiments of the apparatus, the first symbol class can includes symbols [0,1] and [1,0], and the second symbol class can include symbols [0,0] and [1,1]. In any embodiments of the apparatus, the DSP can be configured to precode the symbols of the stream of input symbols prior to the selective differential coding for transmission of an output optical data stream in an optical communication system. In any such embodiments of the apparatus, the selective differential coding can be applied to the input symbols according to a differential coding rule, thereby producing differential-coded symbols. In any embodiments of the apparatus, if a given symbol in the first symbol class is equal to an immediately preceding symbol in the first symbol class, then the given symbol can be coded as [1,0], and, if the given symbol is not equal to the immediately preceding symbol in the first symbol class, then the given symbol can be coded as [0,1]. In any embodiments of the apparatus, the input symbols can include two bits [DIn,DQn], where n is a symbol index, and the symbols are precoded according to: $PI_n = XOR(DI_n, PI_{n-1})$ and $PQ_n = XOR(DQ_n, PQ_{n-1})$, and, $BI_n = PI_n + PI_{n-1} - 1$ and $BQ_n = PQ_n + PQ_{n-1} - 1$, the precoded symbol being $[BI_n, BQ_n]$.

Any embodiments of the apparatus can further comprise an optical-to-electrical converter configured to convert a received optical signal carrying an optical stream of input symbols to the digital-electrical input symbols. In any such embodiments, the selective differential coding can produce a stream of selective-differentially-decoded symbols, and can further comprise post-coding symbols of the selective-differentially-decoded symbol stream. In any embodiments of the apparatus, the selective-differentially-decoded symbols can each include two bits $[BI_n, BQ_n]$, where n is a symbol index, and the selective-differentially-decoded symbols can be post-coded according to: $DI_n=1-|BI_n|$ and $DQ_n=1-|BQ_n|$, the post-coded symbol being $[DI_n, DQ_n]$.

Another embodiment is an optical communication system. The system comprises an optical-to-electrical converter configured to convert a received optical stream of symbols to a digital-electrical stream of received symbols, the received symbols corresponding to signal points of a symbol constellation. The system can also comprise an electrical-to-optical converter configured to convert a digital-electrical stream of transmitted symbols to a transmitted optical stream of symbols. The system can also comprise a digital signal processor. The digital signal processor can be configured to classify the received symbols and the transmitted symbols. In any such embodiment a first symbol class can comprise symbols corresponding to signal points of the symbol constellation that are variant to rotation of the symbol constellation, and, a second symbol class can comprise symbols corresponding to signal points of the symbol constellation that are invariant to rotation of the symbol constellation. The digital signal processor can also be configured to apply selective differential coding only to those input symbols of the first symbol class. In any embodiments of the system, the symbol constellation can be a quadrature duobinary constellation.

BRIEF DESCRIPTION OF THE DRAWINGS

The embodiments of the disclosure are best understood from the following detailed description, when read with the accompanying FIGUREs. Some features in the figures may be described as, for example, "top," "bottom," "vertical" or "lateral" for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which.

In the Figures and text, unless otherwise indicated, similar or like reference symbols indicate elements with similar or the same functions and/or structures.

In the Figures, unless otherwise indicated, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION

The description and drawings merely illustrate the principles of the inventions. It will thus be appreciated that those skilled in the art will be able to devise various arrangements that, although not explicitly described or shown herein, embody the principles of the inventions and are included within its scope. Furthermore, all examples recited herein are principally intended expressly to be for pedagogical purposes to aid the reader in understanding the principles of the inventions and concepts contributed by the inventor(s) to further the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Embodiments of the disclosure mitigate cycle-slip induced error propagation for QDB modulated signals by using differential-coding and differential-decoding techniques as disclosed herein.

Figure 1A:
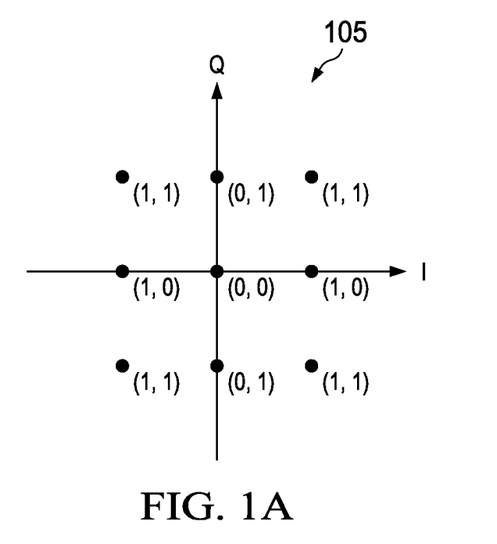
FIG. 1A illustrates an example constellation diagram for QDB modulation.

FIG. 1A presents an example 9-point constellation for a QDB modulated signal. As understood by one skilled in the pertinent art, a QDB modulated signal can be represented by a constellation of nine constellation points 105 with real and imaginary parts referred to as in-phase or I-axis (I), and quadrature or Q-axis (Q), components respectively. As discussed further below each point 105 represents one QDB symbol. Differential-coding and differential-decoding for QPSK (quadrature phase-shift keying), 16QAM (quadrature amplitude modulation), 64QAM, and mPSK are not effective or applicable to QDB modulated signals due, at least, to the latter's 9-point constellation format. Each constellation point 105 is located at one of nine coordinate values. In this discussion, constellation points are represented as I, Q pairs within parentheses, thus $(I,Q)=(0,\pm1)$, $(\pm1,0)$, $(\pm1,\pm1)$ and $(0,0)$.

Figure 1B:
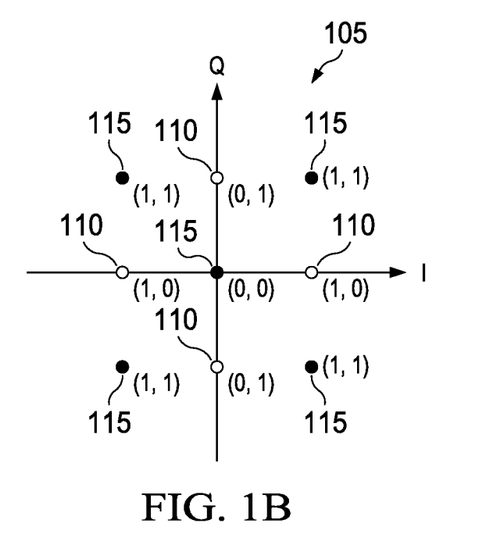
FIG. 1B presents a symbol map corresponding to the example constellation diagram illustrated in FIG. 1A showing constellation points that are susceptible to cycle slip.

FIG. 1B represents a QDB symbol map corresponding to the QDB constellation of FIG. 1A. The symbol map includes four symbols, which may be represented as bracketed bit value pairs, or dibits, [0,0], [0,1], [1,0] and [1,1]. These values may be uniquely represented by the first quadrant of the symbol map, with the other quadrants providing redundant mapping of some symbols. Any of the symbols may be represented by an I/Q pair corresponding to the first quadrant. Thus the [1,1] symbol is represented by four degenerate points in the constellation, the [0,1] and [1,0] symbols are each represented by two degenerate points, and the [0,0] symbol is represented by a single point.

The differential-coding and differential-decoding techniques disclosed herein recognize that only certain classes of the QDB constellation points 105, and corresponding symbols, are subject to the aforementioned propagation error caused by cycle slip.

Symbol classes are illustrated in FIG. 1B, in which the symbols are divided into two classes. A second symbol class 110, referred to herein as Class II symbols, is depicted as filled circles and correspond to QDB constellation points for which a cycle slip may not cause an error. Such Class II symbols can have symbol values of [1,1] or [0,0]. When a cycle slip includes an $n\pi/2$ radian phase rotation, a symbol value of [1,1] remains [1,1] and a symbol value [0,0] remains [0,0], and therefore no ambiguity in the symbol, and hence no error, occurs for the Class II symbols.

The Class II symbols may be described as being invariant to rotation. Symbols that are invariant to rotation are those symbols for which the symbol value does not change when the constellation is rotated about a reference point (e.g. the origin of the coordinate space of the constellation) by an angle of rotational symmetry of the constellation. In the present example angles of rotational symmetry are represented by $n\pi/2$.

The first symbol class 115, sometimes referred to herein as Class I symbols, is depicted as open circles and correspond to QDB constellation points for which a cycle slip can cause an error. Such Class I symbols can have symbol values of [1,0] or [0,1]. In contrast to Class II symbols, when a cycle slip involves, e.g., a $\pi/2$ or $3\pi/2$ phase rotation, the constellation coordinate value (1,0), corresponding to symbol [1,0], will become (0,1) or (0,−1), corresponding to symbol [0,1]. Similarly, the constellation coordinate value (0,1), corresponding to symbol [0,1], will become (−1,0) or (1,0), corresponding to symbol [1,0]. In either example, a Class I symbol error results. Accordingly, the Class I symbols may be described as being variant to rotation.

Embodiments of the disclosure provide coding of optically transmitted data to mitigate the effects of cycle slip. One such embodiment is a method, e.g., a method of differential-coding and differential-decoding a PDM-QDB modulated signal, as performed in one or more digital signal processors (DSPs).

Figure 2A:
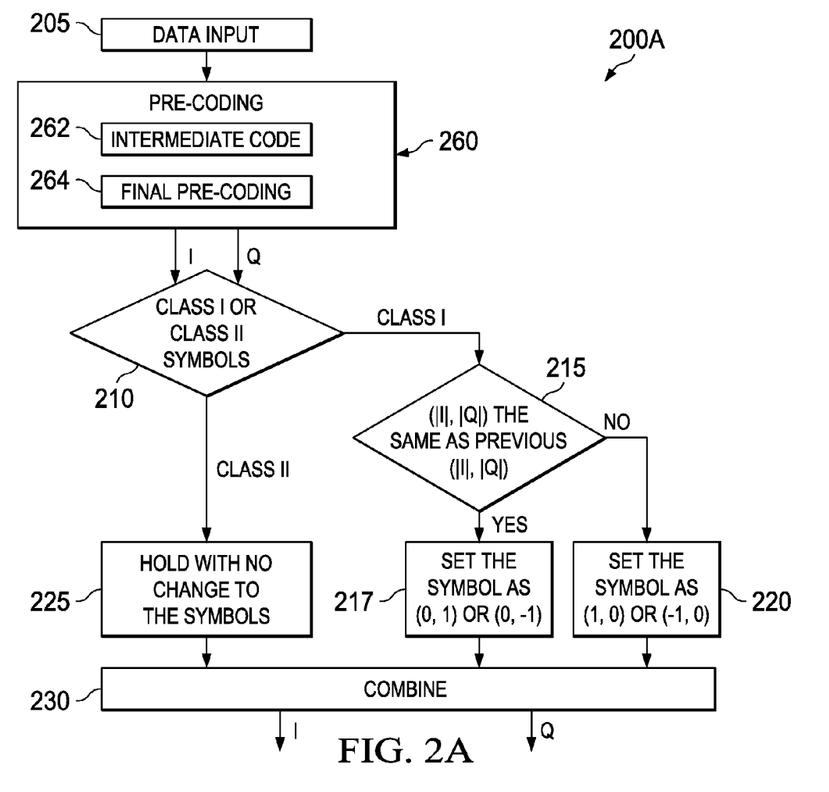
FIG. 2A presents a flow diagram of an example differential-coding scheme for QDB modulation in accordance with the present disclosure.
Figure 2B:
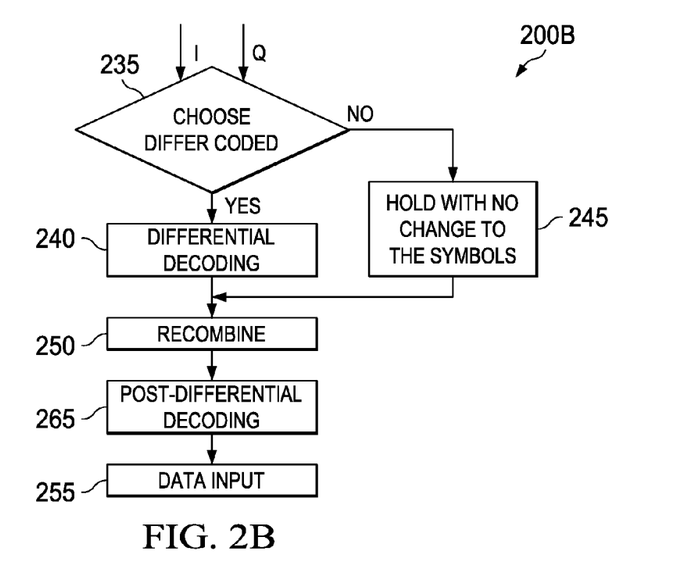
FIG. 2B presents a flow diagram of an example differential-decoding scheme for QDB modulation in accordance with the present disclosure.

FIG. 2A presents a flow diagram of an example differential-coding method 200A for QDB modulation in accordance with the present disclosure. FIG. 2B presents a flow diagram of an example differential-decoding scheme 200B for QDB modulation in accordance with the present disclosure. In various embodiments the method 200A may be performed by an optical transmitter, and the method 200B may be performed by an optical receiver. The illustrated embodiments show differential coding/decoding of a single polarization channel of a modulated optical signal. For a PDM-QDB signal, the signal at each polarization could be processed using the same steps as presented in the described methods.

With continuing reference to FIGS. 2A and 2B throughout, the method 200A commences at a data input step 205 wherein the input data corresponds to digitized data, e.g., a stream . . . $D_{n-1}$, $D_n$, $D_{n+1}$ . . . of pairs of electrical binary-coded digital input values, e.g. symbols $[D_I, D_Q]$, to be transmitted through an optical communication system. As discussed further below, a pre-coding operation 260 may be performed on the input data symbols to produce a stream of pre-coded symbols $[B_I, B_Q]$, . . . $B_{n-1}$, $B_n$, $B_{n+1}$ . . . .

The method 200A includes performing in a step 210, e.g. in a DSP, a classification operation on the input symbols . . . $D_{n-1}$, $D_n$, $D_{n+1}$ . . . . The classification operation includes classifying the input symbols as Class I or Class II symbols. The Class II symbols correspond to those symbols that are invariant to rotation, e.g. [0,0] and [1,1], corresponding in the present example embodiment to those constellation points having I/Q values of equal magnitude, e.g. (I,Q)=(1,1) (−1,1), (1,−1), (−1,−1) and (0,0). The Class I symbols correspond to those symbols that are variant to rotation, e.g. [0,1] and [1,0], corresponding in the present example embodiment to those constellation points having I/Q values on unequal magnitude, e.g. (I,Q)=(0,1) (1,0), (0,−1) and (−1,0).

The method 200A includes applying via steps 215, 217 and 220 a differential coding operation to only the Class I symbols, to produce differential-coded pairs of symbols, according to a differential coding rule. The differential coding rule is applied to each one of the Class I symbols represented in the data-stream. According to the rule, in one embodiment if a given Class I symbol in the symbol stream is the same as the immediately preceding Class I symbol, the given Class I symbol is coded in step 217 as [0,1]. And, according to the rule, if the given symbol is different from the immediately preceding Class I symbol from the stream, then the given symbol is instead coded in step 220 as [1,0]. In an alternate embodiment the given Class I symbol is coded in step 217 as [1,0] and coded as [0,1] in the step 220.

As part of performing the differential coding rule, if the given (current) symbol under consideration in the differential coding operation steps 215, 217, 220 is a first Class I symbol from the data-stream, then coding of the first Class I symbol is not changed. For instance, if the coding for the first Class I symbol was [0,1] or [0,−1], then after step 215 the coding is retained as [0,1] or [0,−1], respectively.

As further illustrated in FIG. 2A, in some embodiments of the method 200A, the Class II symbols, not subject to the differential coding operation step 215, are held, e.g. buffered, in a memory of the DSP in step 225.

As also illustrated in FIG. 2A, in some embodiments of the method 200A, the Class I symbols held in step 225 and the differential-coded Class I symbols in steps 217, 220, are recombined in step 230 in a manner that re-establishes the order of data symbols as present in the input data stream in step 205.

As further illustrated in FIG. 2B, in some embodiments of the method 200B, a choosing step 235 may receive the differential-coded symbols in the recombined data stream (including the Class I symbols subject to steps 215, 217 and 220), e.g. in an optical receiver. In the step 235 the Class I symbols are selected for differential decoding. The selected received symbols are subjected to a differential decoding operation in step 240. In some such embodiments of the method 200B, the symbols of the recombined data stream that were not differential-coded (e.g., the Class I symbols not subject to step 215 and previously held in step 225) are held, e.g. buffered without modification, in a memory of the DSP or a different DSP, in step 245.

In some embodiments, the differential decoding operation in step 240 is applied to the differential-coded symbols to produce differential-decoded symbols, according to a differential decoding rule. As part of performing the differential decoding rule in the step 215, if either the I or Q components of a later differential-coded (Class I) symbol has an absolute value that is the same as the absolute value of the corresponding I or Q component of the immediately preceding differential-coded symbol, then the later differential-coded symbol is decoded as [0,1]. And, as part of performing the differential decoding rule, if both I and Q components of the later differential-coded symbol both have absolute values that are different from those of the immediately preceding differential-coded symbol, then the latter differential-coded symbol is decoded as [1,0]. In an alternative variant of the rule, if either I or Q components of the later differential-coded symbol have absolute values that are the same as those of the immediately preceding differential-coded symbol, then the later differential-coded symbol is decoded as [0,−1]. And, according to the alternative variant of the rule, if both I and Q components of the later differential-coded symbol have absolute values that are different from I and Q of the immediately preceding differential-coded symbol, then the one differential-coded symbol is decoded as [−1,0].

Also as part of the performing the differential decoding rule, if the later differential-coded symbol is a first symbol of the differential-coded symbols from the data-stream, then coding of the first symbol is not changed. For instance, if the coding for the first of Class I symbols was [0,1] (or [0,−1]), then after step 240 the coding is retained as [0,1] (or (0,−1)], respectively.

As further illustrated in FIG. 2B, in some embodiments of the method 200B, the differential-decoded symbols formed in step 240 and the non-differential-decoded symbols held in step 245 are then recombined in step 250 in a manner that re-establishes the order of data symbols as present in the input data stream in step 205 and/or 235. The method 200B stops at data output step 255.

As part of the differential coding operation in step 215 or the differential decoding operation in step 240, whether the in-phase and quadrature components of the Class pairs of symbols are encoded/decoded as 1 or −1 depends on the immediately preceding symbol in the data-stream. The setting to 1 or −1 may be made to ensure that the level changes between the I components of adjacent symbols, and/or between the Q components of adjacent symbols, do not exceed unity.

Some embodiments of the method 200A further include a pre-differential coding operation in step 260 to convert binary data to duobinary data for each quadrature of a QDB signal, having values of −1, 0, and 1. The pre-differential coding operation in step 260 may be separately performed, e.g. in the DSP, on all of the individual ones of the pairs of electrical digital input from step 205 prior to the classification operation step 210. That is, the symbols subject to the classification operation in step 210 are formed after the pre-differential coding operation step 260.

The pre-differential coding operation step 260 is separately performed on the I components and on the Q components of the processed symbols. In some embodiments, for example, the pre-differential coding operation step 260 includes for each one of the I/Q pairs of input signals (e.g., coded as binary symbols), $DI_n$ and $DQ_n$, to be represented as the in-phase and quadrature of QDB modulated signals, respectively, applying a pre-differential coding rule in step 262:

$$PI_n = \text{XOR}(DI_n, PI_{n-1}) \text{ and } PQ_n = \text{XOR}(DQ_n, PQ_{n-1})$$

wherein $PI_n$ and $PQ_n$ are intermediate pre-differential coded I/Q components to represent the in-phase and quadrature QDB signals of the n-th datum in the data-stream to be modulated, and wherein XOR is an exclusive logical OR operation. The pre-differential coding rule then further includes applying a second pre-differential coding rule in step 264:

$$BI_n = PI_n + PI_{n-1} - 1, \text{ and, } BQ_n = PQ_n + PQ_{n-1} - 1$$

wherein $BI_n$ and $BQ_n$ respectively, correspond to the pre-differential coded in-phase and quadrature duobinary components for the QDB modulated symbols corresponding to the electrical digital input symbols operated on in step 210.

Some embodiments of the method 200B further include a post-differential-decoding operation in a step 265 to convert duobinary data to binary data for each of the I and Q components of a QDB signal. The post-differential-decoding operation in step 265 may be separately performed, in the DSP or in a different DSP, on all of the individual ones of the recombined data stream of symbols (e.g., from step 250) that include the differential-decoded pairs of Class I symbols (e.g., decoded in step 240) recombined with the pairs of Class II symbols (e.g., held in step 245).

In some embodiments, for example, the post-differential-decoding operation step 265 includes for each one of the symbols representing the recombined data stream of symbols, applying a post-differential decoding rule:

$$DI'_n = 1 - |EI_n| \text{ and } DQ'_n = 1 - |EQ_n|$$

wherein $EI'_n$ and $EQ'_n$ respectively, represent the in-phase and quadrature components of the data stream output by the step 240, and $DI'_n$ and $DQ'_n$ respectively, represent the in-phase and quadrature duobinary modulated post-differential decoded signals of the n-th datum in an output (e.g., binary data output) data-stream (step 255).

In some embodiments of the method 200A, the re-established data stream containing differential-coded symbols (step 230) may be transmitted via an optical communication system, such as the system 400 discussed in the context of FIG. 4, below.

In some embodiments of the method 200A, the differential coding operation (steps 215, 217, 220) is performed in the DSP of a transmitter subunit of the optical communication system. In some embodiments, the holding, the recombining and pre-differential coding operation steps 225, 230, 260 are also performed in the DSP of the transmitter subunit.

In some embodiments of the method 200B, the differential decoding operation (step 240) is performed in a different DSP of a receiver subunit of the same optical communication system or a remote optical communication system. In some embodiments, the second holding, the second recombining and post-differential decoding operation steps 245, 250, 265 are also performed in the different DSP of the same or remote receiver subunit.

Figure 3:
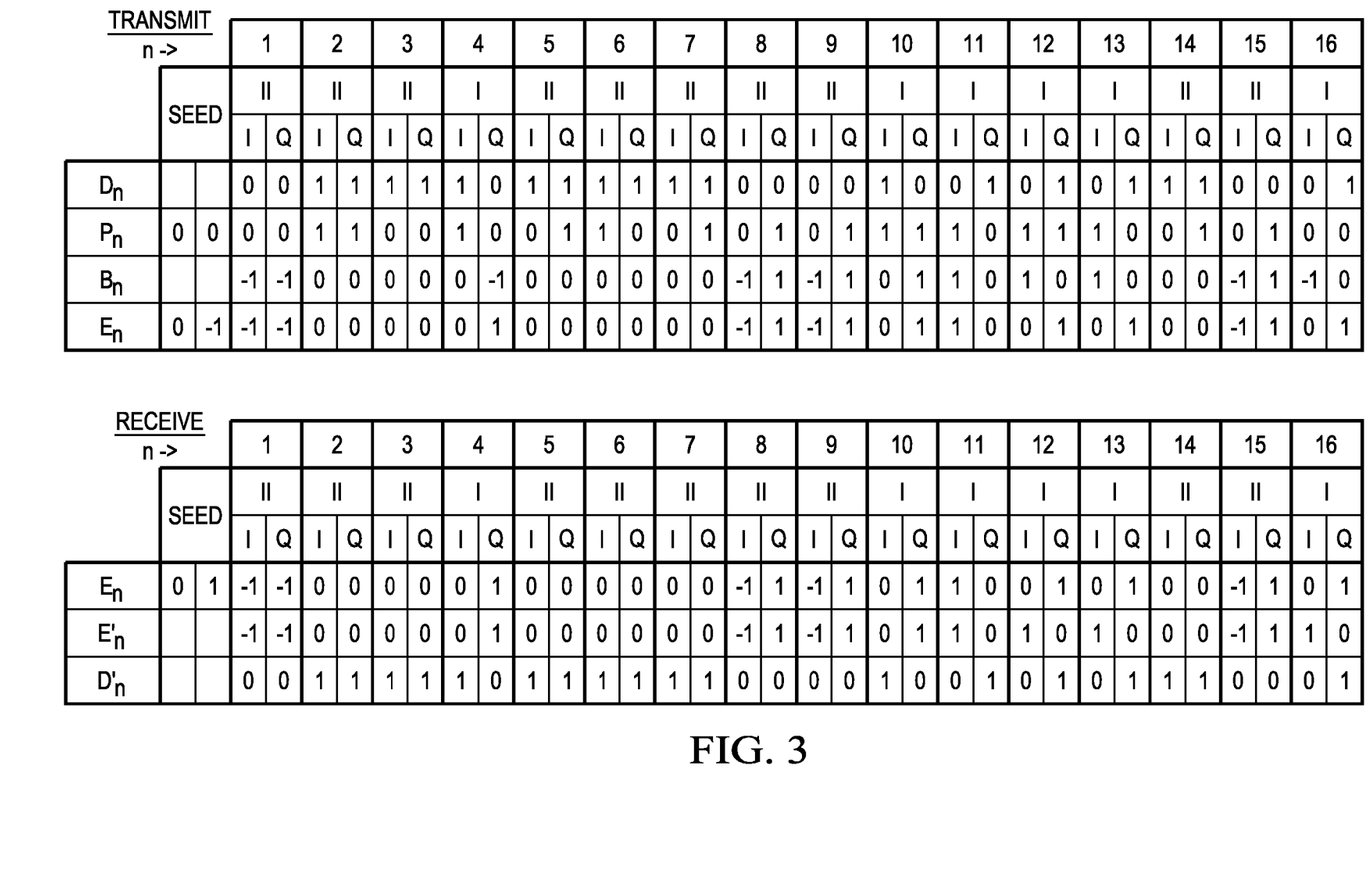
FIG. 3 presents an example chart showing selected steps in an example method of differential-coding and differential-decoding for an example stream of QDB symbols in accordance with method embodiments of the present disclosure such as the example embodiments presented in FIGS. 2A and 2B.

FIG. 3 presents an chart showing selected steps in an example method of differential-coding and differential-decoding for an example data stream of QDB signals in accordance with a method embodiment of the such as the example embodiment presented in FIGS. 2A and 2B.

FIG. 3 presents a data stream represented by a tabular presentation of 16 symbols (n=16) of the data system. With continuing reference to FIGS. 2A, 2B and 3 throughout, $DI_n$ and $DQ_n$ are respectively I and Q components of input symbols of QDB signals from the input data to be modulated presented in step 205. As illustrated in FIG. 3 as part of pre-coding step 260, after the applying the first pre-coding rule (step 262) the intermediate pre-coded symbols, [$PI_n$, $PQ_n$], are generated and after the applying the second pre-coding rule (step 264) the pre-coded symbols, [$BI_n$, $BQ_n$], are generated. To facilitate performing the second rule, a seed value is used as a 0-th symbol.

The classification step 210 is performed on the pre-coded symbols, [$BI_n, BQ_n$]. The differential coding step 215 (including steps 217 and 220) is performed only on the Class I symbols (n=4, 10-13 and 16), while the Class II symbols (n=1-3, 5-9, 14-15) are held in step 225. After differential coding (step 215) the Class I and II symbols are recombined in step 230 to form the output symbol stream . . . [$EI_{n-1}$, $EQ_{n-1}$], [$EI_n, EQ_n$], [$EI_{n+1}, EQ_{n+1}$] . . . . The recombined symbols may then be converted (e.g., via an optical modulator) into an optical in-phase and quadrature QDB modulated signals that are transmitted over a long distance (e.g., kilometers), e.g., via an optical fiber.

The optical symbols may then be converted (e.g., via an optical-to-electrical receiver) back into digital electrical signals, component pairs that are equivalent to the recombined data stream of symbols [$EI_n, EQ_n$] formed in step 230.

The recombined data stream of symbols [$EI_n, EQ_n$] is subjected to the choosing step 235, and the differential-coded pairs of symbols, the Class I symbols, are then subject to the differential decoding in step 240 while the non-differential-coded symbols, the Class II symbols, are held in step 245. After the differential decoding step 240 the Class I and Class II symbols are then recombined in step 250 in a manner that re-establishes the order of data symbols as present in the input data stream in step 205, thereby forming a stream of recombined differential decoding symbol pairs ($EI'_n, EQ'_n$).

In step 265 the recombined differential decoding symbols ($EI'_n, EQ'_n$) are subject to a post-decoding operation on all of the symbols in the recombined data stream of symbols (e.g., from step 250) to form post-differential decoded symbols ($DI'_n, DQ'_n$) that can be output at step 255.

Thus it is seen from FIG. 3 the input data may be recovered at the output after the coding and decoding processes described by FIGS. 2A/B and the related description.

Another embodiment of the disclosure is an optical communication system. FIG. 4 presents a block diagram of an example optical communication system 400 using QDB modulation with differential-coding and differential-decoding in accordance with the present disclosure.

Figure 4:
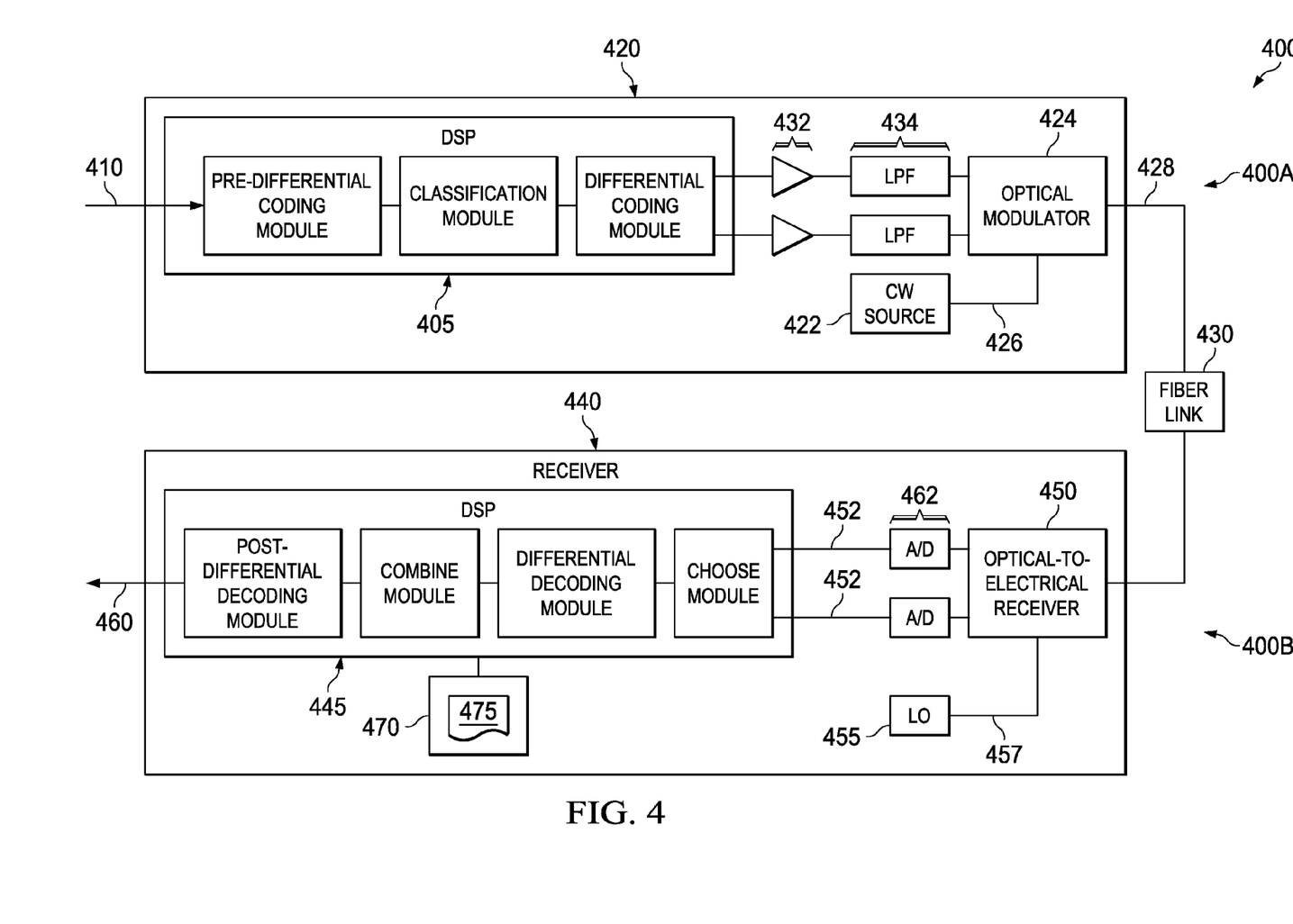
FIG. 4 presents a block diagram of an example communication system using QDB modulation with differential-coding and differential-decoding in accordance with method embodiments of the present disclosure such as the examples method presented in FIGS. 2A and 2B.

With continuing reference to FIGS. 2A, 2B and 4 throughout, the system 400 comprises a DSP 405 that can receive a data stream 410 (e.g., the electrical digital input symbols in step 205). The DSP 405 is programmed, or has sub-modules programmed, to perform the classification operation on digital electrical input symbols (e.g., step 210) and then apply the differential coding operation to only the Class I symbols (e.g., step 215). In some embodiments the DSP 405 is also programmed to perform the holding operation (e.g., step 225), the combining operation (e.g., step 230) and the pre-differential coding operation (e.g., step 260).

In some embodiments, the DSP 405 can be embodied in an application-specific integrated circuit (ASIC) that includes one or more microprocessors, memory blocks, and other circuit components familiar to those skilled in the arts, that are customized to perform the classifying, differential coding, pre-coding, holding and recombining operations (e.g. steps 210-230 and 260). In other embodiments, the integrated circuit 405 can be embodied in a general purpose integrated circuit. In some embodiments of the ASIC or general-purpose integrated circuit can include one or more microprocessors and memory blocks that can be programmed to perform such operations, as stored on computer readable medium, as computer-executable instructions.

In some embodiments, the DSP 405 is part of a transmitter subunit 420 of an optical communication system 400. Embodiments of the system 400 can further include an optical source 422 and an optical modulator 424.

The optical source 422 can generate an optical beam 426 at a carrier wavelength of light. In some embodiments, the source 422 is a laser, such as a laser diode. In some embodiments, the optical beam 426 can be in any one of the common optical telecommunication bands, including the Original ("O") band (e.g., about 1260 nm to about 1360 nm), Extended ("E") band (e.g., about 1360 nm to about 1460 nm), Short ("S") band (e.g., about 1460 nm to about 1530 nm), Conventional ("C") band (e.g., about 1530 nm to about 1565 nm), Long ("L") band (from e.g., 1565 nm to about 1625 nm) or Ultralong ("U") band (e.g., about 1625 nm to about 1675 nm).

The optical modulator 424 can receive the optical beam 426, and modulate the optical beam 426 as driven by electrical signals carrying a data stream of the I and Q components of the differential-coded symbol stream from the DSP 405. The optical modulator 424 (e.g., an optical IQ optical modulator) can generate an optical output signal 428 that emits the in-phase and quadrature pairs of the QDB modulated signals. One skilled in the pertinent art would understand how electrical signals carrying a data stream, e.g. a stream of the differential-coded pairs of symbols as disclosed herein, can be converted to optical quadrature duobinary modulated signals by the optical modulator 424.

As illustrated in FIG. 4, the QDB modulated optical output signal 428 can carry the information conveyed by the digital electrical input symbols (e.g., information received at the data input at step 205) to an optical fiber 430 or network of optical fibers and amplifiers, and in some cases, carry the output signal 428 over long distances (e.g., kilometer of longer distances).

As further illustrated in FIG. 4, in some embodiments, to facilitate accurate transmission of the differential-coded pairs of symbols from the DSP 405 to the optical modulator 426 the transmitter subunit 405 can further include one or more amplifiers 432 configured to receive and amplify electrical signals corresponding to the differential-coded pairs of symbols.

As further illustrated in FIG. 4, in some embodiments, to facilitate accurate transmission of the differential-coded pairs of symbols from the DSP 405 to the optical modulator 424 the transmitter subunit 405 can further include one or more low pass filters 434 (LPFs) configured to receive the amplified electrical signals output from the amplifiers 432.

As illustrated in FIG. 4, some embodiments of the system 400 can further includes a receiver subunit 440. In some embodiments, the DSP 405 can also be part of the receiver subunit 440, and in such embodiments, the transmitter and receiver subunits 405, 440 can be part of, or be, a transceiver of the system 400. In other embodiments, including the illustrated embodiment, the receiver subunit 440 can include a different DSP 445. The DSP 405, or the different DSP 445, includes an integrated circuit (e.g., the same circuit in which the DSP 405 is embodied or a different circuit) that is programmed to apply a differential decoding operation (e.g., step 240). The DSP 405, or the different DSP 445, respectively, can also be programmed, or have sub-modules programmed, to perform the choosing operation (e.g., step 235), the combining operation (e.g., step 250), and the post-differential decoding operation (step 265) and in some embodiments other modules to perform other operations (e.g., dispersion compensation, carrier separation, demodulation etc.) familiar to those skilled in the art.

In some embodiments of the system 400, the receiver subunit 440 can further include an optical-to-electrical receiver 450 configured to receive as input the optical signal of in-phase and quadrature components of duobinary modulated signals (e.g., differential-coded symbols transmitted to the receiver subunit 440 as optical signal of in-phase and quadrature components of duobinary modulated signals 428 via the optical fiber 430) and produce as output an electrical signal 452 that includes the differential-coded symbols (e.g., [$EI_n, EQ_n$] symbol pairs) and output electrical signal output data 460 (e.g., data output in step 255) having the differential decoded symbols (e.g., [$EI'_n, EQ'_n$] symbols) or post-differential decoded symbols (e.g., [$DI'_n, DQ'_n$] symbols).

To facilitate the optical-to-electrical conversion, some embodiments the receiver subunit 440 can include an optical local oscillator 455 connected to deliver a reference optical signal 457 to the optical-to-electrical receiver 450. Embodiments of the receiver subunit 440 can include analog-to-digital converters 462 (ADC) connected to the optical-to-electrical receiver 450 and connected to deliver digital electrical signals 452, including the differential-coded pairs, to a DSP (e.g., DSP 445).

FIG. 4 illustrates another embodiment of the disclosure: a non-transitory computer readable medium 470. The medium 470 comprises software instructions 475 stored on the computer readable medium 470. While shown connected to the DSP 445, the medium 470, or a different medium, may provide instructions to the DSP 420. In some embodiments the medium 470 can be in the form of non-transitory memory or firmware in the DSP 405 or the different DSP 445. In other cases, the computer-readable medium can be stored on hard disks, CDs, floppy disks, thumb drive, or other media familiar to those skilled in the art, in a computer that is remotely located from the DSP 405 and/or the different DSP 445 but sends the computer-executable instructions to the DSP 405 and/or the different DSP 445.

The instructions 475 when processed by the digital signal processor 405, perform a method (e.g., method 200A) that includes processing the input symbols representing a datastream of electrical digital input symbols (e.g., input data 410) including the classification operation 210 and the differential coding operation 215.

In some embodiments the software instructions 475 include instructions to perform the holding operation (e.g., step 225), the combining operation (e.g., step 230) and the pre-differential coding operation (e.g., step 260). In some embodiments the instructions 475, when executed by the DSP 405 or the different DSP 445, perform the differential decoding operation (e.g., step 240). In some embodiments, the software instructions 475 include instructions to perform the choosing operation (e.g., step 235), the combining operation (e.g., step 250), and the post-differential decoding operation (step 265).

Figure 5:
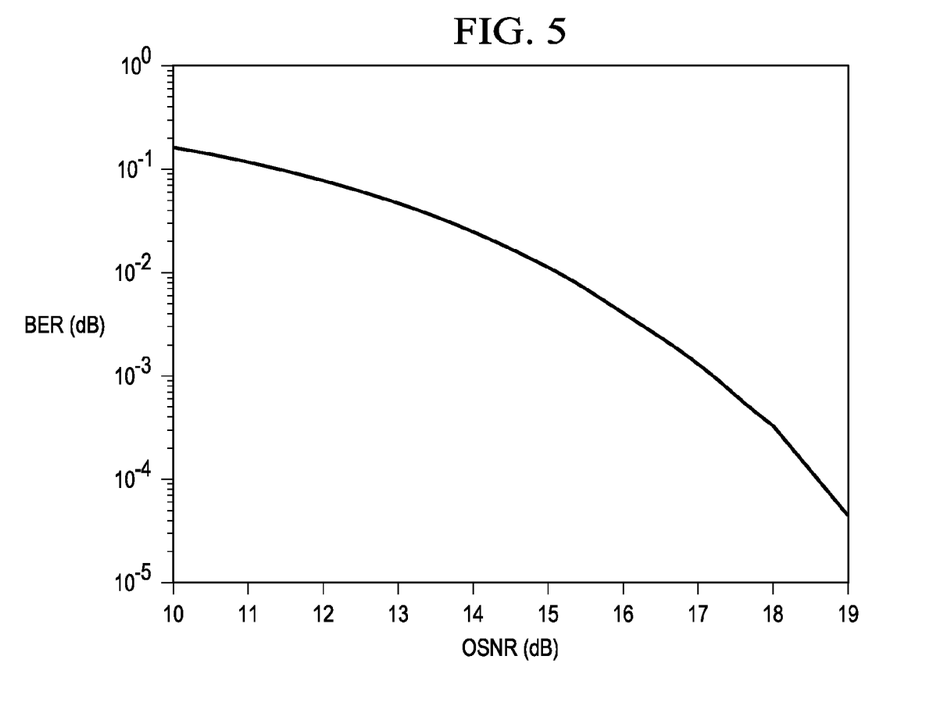
FIG. 5 depicts a plot of bit-error-rate (BER) versus optical signal-to-noise ratio (OSNR) for an example simulated data signal using differential-coding and differential-decoding operations for the simulated data in accordance with the present disclosure such as described in the context or FIGS. 2-4.

The effectiveness of the differential coding and decoding operation as described herein was tested using simulated data. FIG. 5 depicts a plot of bit-error-rate (BER) versus optical signal-to-noise rate (OSNR) for an example data signal using differential-coding and differential-decoding for simulated data in accordance with the present disclosure. The simulated data signal is configured to represent a 128 Gigabyte per second data stream of PDM QDB encoded signals. The optical source 422 and local oscillator 455 are assumed to have a 500 kHz line width. In the simulation, the Viterbi-Viterbi carrier phase estimation method, familiar to those skilled in the art, was used for carrier phase recovery.

As illustrated in FIG. 5, substantially no cycle-slip induced error propagation is observed as demonstrated by the smooth continuous curve relationship between BER and OSNR.

Although the present disclosure has been described in detail, those skilled in the art should understand that they can make various changes, substitutions and alterations herein without departing from the scope of the invention.

What is claimed is:

1. A method, comprising:
    receiving digital-electrical input symbols of a stream of input symbols, the input symbols corresponding to signal points of a quadrature duobinary symbol constellation;
    classifying the input symbols, wherein a first symbol class comprises input symbols corresponding to signal points that are variant to rotation of the symbol constellation, and a second symbol class comprises input symbols corresponding to signal points that are invariant to rotation of the symbol constellation; and
    applying selective differential coding only to those input symbols of the first symbol class.

2. The method as recited in claim 1, wherein the first symbol class includes symbols [0,1] and [1,0], and the second symbol class includes symbols [0,0] and [1,1].

3. The method as recited in claim 2, wherein:
    the differential coding is applied to the input symbols according to a differential coding rule, thereby producing differential-coded symbols; and
    wherein:
        if a given symbol in the first symbol class is equal to an immediately preceding symbol in the first symbol class, then the given symbol is coded as [1,0]; and,
        if the given symbol is not equal to the immediately preceding symbol in the first symbol class, then the given symbol is coded as [0,1].

4. The method as recited in claim 3, wherein said input symbols include two bits [$DI_n, DQ_n$], where n is a symbol index, and said symbols are precoded according to $$PI_n = \mathrm{XOR}(DI_n, PI_{n-1}) \text{ and } PQ_n = \mathrm{XOR}(DQ_n, PQ_{n-1});$$
and $$BI_n = PI_n + PI_{n-1} - 1 \text{ and } BQ_n = PQ_n + PQ_{n-1} - 1,$$

the precoded symbol being [$BI_n, BQ_n$].

5. The method as recited in claim 1, wherein the symbols of the stream of input symbols are precoded prior to the selective differential coding for transmission of an output optical data stream in an optical communication system.

6. The method as recited in claim 1, further comprising:
    receiving an optical signal carrying an optical stream of input symbols; and
    converting said optical stream to said digital-electrical input symbols.

7. The method as recited in claim 6, wherein said selective differential coding produces a stream of selective-differentially-decoded symbols, and further comprising post-coding symbols of said selective-differentially-decoded symbol stream.

8. The method as recited in claim 7, wherein said selective-differentially-decoded symbols each include two bits [$BI_n, BQ_n$], where n is a symbol index, and said selective-differentially-decoded symbols are post-coded according to:

$$DI_n = 1 - |BI_n| \text{ and } DQ_n = 1 - |BQ_n|,$$

the post-coded symbol being [$DI_n, DQ_n$].

9. An apparatus, comprising:
a digital signal processor (DSP) configured to receive digital-electrical input symbols of a stream of input symbols, the input symbols corresponding to signal points of a quadrature duobinary symbol constellation;
a symbol classifier configured to classify the input symbols, wherein a first symbol class comprises input symbols corresponding to signal points that are variant to rotation of the symbol constellation, and a second symbol class comprises input symbols corresponding to signal points that are invariant to rotation of the symbol constellation; and
a selective differential encoder configured to apply selective differential coding only to those input symbols of the first symbol class.

10. The apparatus as recited in claim 9, wherein the first symbol class includes symbols [0,1] and [1,0], and the second symbol class includes symbols [0,0] and [1,1].

11. The apparatus as recited in claim 10, wherein:
the selective differential coding is applied to the input symbols according to a differential coding rule, thereby producing differential-coded symbols; and
wherein:
if a given symbol in the first symbol class is equal to an immediately preceding symbol in the first symbol class, then the given symbol is coded as [1,0]; and,
if the given symbol is not equal to the immediately preceding symbol in the first symbol class, then the given symbol is coded as [0,1].

12. The apparatus as recited in claim 11, wherein said input symbols include two bits $[DI_n, DQ_n]$, where n is a symbol index, and said symbols are precoded according to:

$$PI_n = \text{XOR}(DI_n, PI_{n-1}) \text{ and } PQ_n = \text{XOR}(DQ_n, PQ_{n-1});$$
and $$BI_n = PI_n + PI_{n-1} - 1 \text{ and } BQ_n = PQ_n + PQ_{n-1} - 1,$$

the precoded symbol being $[BI_n, BQ_n]$.

13. The apparatus as recited in claim 12, further comprising:
an optical-to-electrical converter configured to convert a received optical signal carrying an optical stream of input symbols to said digital-electrical input symbols, wherein said selective differential coding produces a stream of selective-differentially-decoded symbols, and further comprising post-coding symbols of said selective-differentially-decoded symbol stream, and wherein said selective-differentially-decoded symbols each include two bits $[BI_n, BQ_n]$, where n is a symbol index, and said selective-differentially-decoded symbols are post-coded according to:

$$DI_n = 1 - |BI_n| \text{ and } DQ_n = 1 - |BQ_n|,$$

the post-coded symbol being $[DI_n, DQ_n]$.

14. The apparatus as recited in claim 9, wherein the DSP is configured to precode the symbols of the stream of input symbols prior to the selective differential coding for transmission of an output optical data stream in an optical communication system.

15. The apparatus as recited in claim 9, further comprising:
an optical-to-electrical converter configured to convert a received optical signal carrying an optical stream of input symbols to said digital-electrical input symbols.

16. The apparatus as recited in claim 15, wherein said selective differential coding produces a stream of selective-differentially-decoded symbols, and further comprising post-coding symbols of said selective-differentially-decoded symbol stream.

17. The apparatus as recited in claim 16, wherein said selective-differentially-decoded symbols each include two bits $[BI_n, BQ_n]$, where n is a symbol index, and said selective-differentially-decoded symbols are post-coded according to:

$$DI_n = 1 - |BI_n| \text{ and } DQ_n = 1 - |BQ_n|,$$

the post-coded symbol being $[DI_n, DQ_n]$.

18. An optical communication system, comprising:
an optical-to-electrical converter configured to convert a received optical stream of symbols to a digital-electrical stream of received symbols, the received symbols corresponding to signal points of a quadrature duobinary symbol constellation;
an electrical-to-optical converter configured to convert a digital-electrical stream of transmitted symbols to a transmitted optical stream of symbols; and
a digital signal processor configured to:
classify the received symbols and the transmitted symbols, wherein a first symbol class comprises symbols corresponding to signal points of the symbol constellation that are variant to rotation of the symbol constellation, and a second symbol class comprises symbols corresponding to signal points of the symbol constellation that are invariant to rotation of the symbol constellation; and
applying selective differential coding only to those input symbols of the first symbol class.

19. The system as recited in claim 18, wherein the first symbol class includes symbols [0,1] and [1,0], and the second symbol class includes symbols [0,0] and [1,1].

20. The system as recited in claim 18, wherein:
the selective differential coding is applied to the input symbols according to a differential coding rule, thereby producing differential-coded symbols; and
wherein:
if a given symbol in the first symbol class is equal to an immediately preceding symbol in the first symbol class, then the given symbol is coded as [1,0]; and,
if the given symbol is not equal to the immediately preceding symbol in the first symbol class, then the given symbol is coded as [0,1].

21. The system as recited in claim 20, wherein said input symbols include two bits $[DI_n, DQ_n]$, where n is a symbol index, and said symbols are precoded according to:

$$PI_n = \text{XOR}(DI_n, PI_{n-1}) \text{ and } PQ_n = \text{XOR}(DQ_n, PQ_{n-1});$$
and $$BI_n = PI_n + PI_{n-1} - 1 \text{ and } BQ_n = PQ_n + PQ_{n-1} - 1,$$

the precoded symbol being $[BI_n, BQ_n]$.

* * * * *